United States Patent [19]
Cornwall

[11] Patent Number: 5,127,425
[45] Date of Patent: Jul. 7, 1992

[54] HORIZONTAL FIRESTOP FITTING

[76] Inventor: Kenneth R. Cornwall, 4963 Springfield Dr., Dunwoody, Ga. 30338

[21] Appl. No.: 701,057

[22] Filed: May 16, 1991

[51] Int. Cl.⁵ ............................................. F16K 17/38
[52] U.S. Cl. ............................................. 137/1; 52/232; 137/75; 137/360
[58] Field of Search ................. 137/1, 75, 360; 52/232

[56] References Cited

U.S. PATENT DOCUMENTS

| | | |
|---|---|---|
| 2,128,292 | 8/1938 | Finn ........................................ 137/75 |
| 3,726,050 | 4/1973 | Wise .................... 137/75 X |
| 4,583,565 | 4/1986 | Cornwall . |
| 4,638,829 | 1/1987 | Cornwall . |
| 4,724,858 | 2/1988 | Cornwall . |
| 4,788,800 | 12/1988 | Whiteley ............................ 52/232 X |

Primary Examiner—Robert G. Nilson
Attorney, Agent, or Firm—Ian C. McLeod

[57] ABSTRACT

An improved firestop fitting (10) which prevents the spread of smoke and fire through a wall (100, 110, 120) between rooms in a building is described. The fitting includes a thermally releasable plug (16) mounted in an extension conduit (14) from a main conduit (12) of the fitting which is activated by a fire to allow the plug to move into and block the main conduit. The fitting is particularly adapted for buildings where plastic pipe is used to carry fluid between rooms.

45 Claims, 3 Drawing Sheets

HORIZONTAL FIRESTOP FITTING

BACKGROUND OF THE INVENTION

(1) Field of the Invention

The present invention relates to a new firestop fitting and coupling combination for use in buildings which allows penetration of piping through a wall without creating a fire path between rooms in the building. In particular, the present invention relates to a fitting which includes a blocking means for the piping which is activated by the fire to prevent the spread of the fire between rooms in a building.

(2) Prior Art

Pipe penetrations through walls in buildings create a number of problems because a seal between the rooms is broken by the pipe. The problem of fire safety when piping penetrates fire rated walls between rooms is particularly troublesome because these openings can jeopardize the fire integrity of the entire building. As a result, in most buildings plastic (PVC) pipe is not used since fire can easily penetrate the wall by burning the pipe A primary problem has been to develop a device which solves the fire safety problem associated with pipe penetrations so that plastic pipe can be used as a construction material between rooms in a building. The prior art has not provided a solution to this problem which is acceptable to fire marshalls, government officials, insurance companies and others.

My U.S. Pat. Nos. 4,583,565; 4,638,829 and 4,724,858 describe firestop fittings particularly adapted to prevent the spread of fire and smoke between floors in a multi-story building by plugging off any potential fire path through a vertical pipe between the floors. However, these devices are not particularly adapted for preventing the spread of smoke and fire between adjoining rooms in a building.

OBJECTS

It is therefore an object of the present invention to provide a firestop fitting and coupling combination between adjoining rooms in a building that is adaptable to plastic horizontal drainage pipe. Further, it is an object of the present invention to provide a firestop fitting and coupling combination which is activated by fire in one room to create a blockage between adjoining rooms and which in normal use does not interfere with the primary fluid carrying function of the horizontal drainage pipe between the rooms. Further, it is an object of the present invention to provide a firestop fitting and coupling which satisfies those people responsible for the safety of new building constructions. Still further, it is an object of the present invention to provide a firestop fitting and coupling which is inexpensive to manufacture and easily mounted between adjoining rooms in a building. These and other objects will become increasingly apparent by reference to the following descriptions and to the drawings.

GENERAL DESCRIPTION

A firestop fitting which prevents the spread of smoke and fire through a wall between rooms in a building which comprises: a non-flammable, fluid carrying main conduit having opposed ends which provide an opening along a longitudinal axis through the wall of the building and adapted to be connected to horizontally oriented fluid carrying plastic pipe in rooms including the wall in the building; a non-flammable extension conduit from the main conduit having a second axis perpendicular to the axis of the main conduit with an inside wall extending to an opening; a non-flammable plug mounted in the extension conduit on a plastic support provided in the extension conduit which is releasable by melting upon exposure of the support to heat less than necessary for heat destruction of the plastic pipe to which the main conduit is adapted to be connected from a fire in the building to thereby move the plug into and block the main conduit; and closure means for the extension conduit opening.

In particular, the present invention relates to a firestop fitting which prevents the spread of smoke and fire through a wall between rooms in a building which comprises: a non-flammable, fluid carrying main conduit having opposed ends which provide an opening along a longitudinal axis through the wall of the building and adapted to be connected to horizontally oriented fluid carrying plastic pipe in rooms including the wall in the building; a non-flammable extension conduit from the main conduit having a second axis perpendicular to the axis of the main conduit with an inside wall extending to an opening; a non-flammable plug mounted in the extension conduit which is releasable by melting upon exposure of the support to heat less than necessary for heat destruction of the plastic pipe to which the main conduit is adapted to be connected from a fire in the building to thereby move the plug into and block the main conduit, wherein the plastic support is provided by a harness with a strap upon which the plug rests, with the harness joined to a holding ring which is mounted in the extension conduit and wherein the strap is broken by heat from a fire to release the plug which moves by gravity into the main conduit; and closure means for the extension conduit opening.

Further, the present invention relates to a building construction which prevents the spread of smoke and fire through a wall between rooms in a building which comprises: a firestop fitting which prevents the spread of fire and smoke through the wall between rooms in the building which comprises: a non-flammable, fluid carrying main conduit having opposed ends which provide an opening along a longitudinal axis through the wall of the building and adapted to be connected to horizontally oriented fluid carrying plastic pipe in rooms including the wall in the building; a non-flammable extension conduit from the main conduit having a second axis perpendicular to the axis of the main conduit with an inside wall extending to an opening; a non-flammable plug mounted in the extension conduit on a plastic support provided in the extension which is releasable by melting upon exposure of the support to heat less than necessary for heat destruction of the plastic pipe to which the main conduit is adapted to be connected from a fire in the building to thereby move the plug into and block the main conduit; and fluid carrying plastic pipe connected to both ends of the main conduit.

In particular, the present invention relates to a building construction which prevents the spread of smoke and fire through a wall between rooms in a building which comprises: a firestop fitting which prevents the spread of fire and smoke through the wall between rooms in the building which comprises: a non-flammable, fluid carrying main conduit having opposed ends which provide an opening along a longitudinal axis mounted through the wall of the building and adapted to be connected to horizontally oriented fluid carrying plastic pipe in rooms including the wall in the building; a non-flammable extension conduit from the main conduit having a second axis perpendicular to the axis of the main conduit with an inside wall extending to an opening; a non-flammable plug mounted in the extension conduit on a plastic support provided in the extension conduit which is releasable by melting upon exposure of the support to heat less than necessary for heat destruction of the plastic pipe to which the main conduit is adapted to be connected from a fire in the building to thereby move the plug into and block the main conduit wherein the plastic support is provided by a harness with a strap upon which the plug rests, with the harness joined to a holding ring which is mounted in the extension conduit and wherein the strap is broken by heat from a fire to release the plug which moves by gravity into the main conduit; and closure means for the extension conduit opening; and fluid carrying plastic pipe connected to both ends of the main conduit.

The firestop fitting of the present invention provides a practical and effective system for preventing the spread of fire, smoke and toxic fumes from spreading between rooms in a building. The stack fitting which penetrates the wall and the releasable plug are composed of cast iron, a non-combustible material. The harness is preferably constructed from one strap or two straps in an overlapping X pattern. The X pattern takes longer to melt through to release the plug and is slightly more expensive to manufacture than a single strap.

The preferred operation of the plug in the firestop fitting is very simple, usually relying upon gravity. To prevent the spread of fire between rooms in a building, a non-flammable cast iron plug is released into the main conduit of the firestop fitting of a thermally triggered release harness which melts, preferably at approximately 250° F. The released cast iron plug blocks the cast iron main conduit, which penetrates the wall, and prevents the spread of flames and smoke to the room on the other side of the wall. The following is a detailed description of the preferred firestop fitting of the present invention.

SPECIFIC DESCRIPTION

Figure 2:
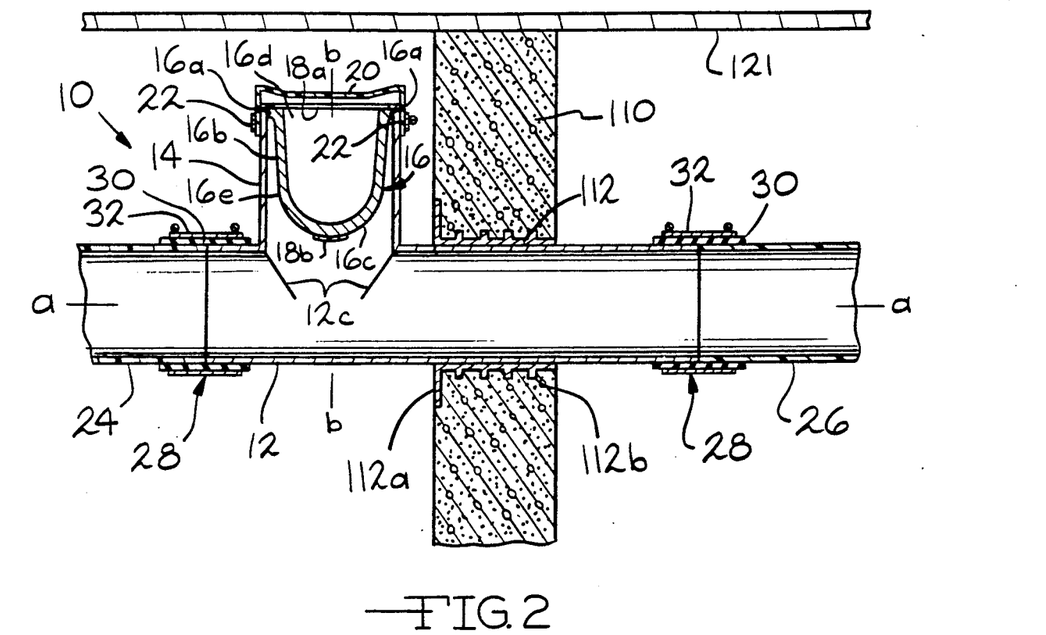
FIG. 2 is a front, cross sectional view of the firestop fitting 10 horizontally mounted through a flanged coupling 112 horizontally mounted in a poured concrete wall 110.
Figure 3:
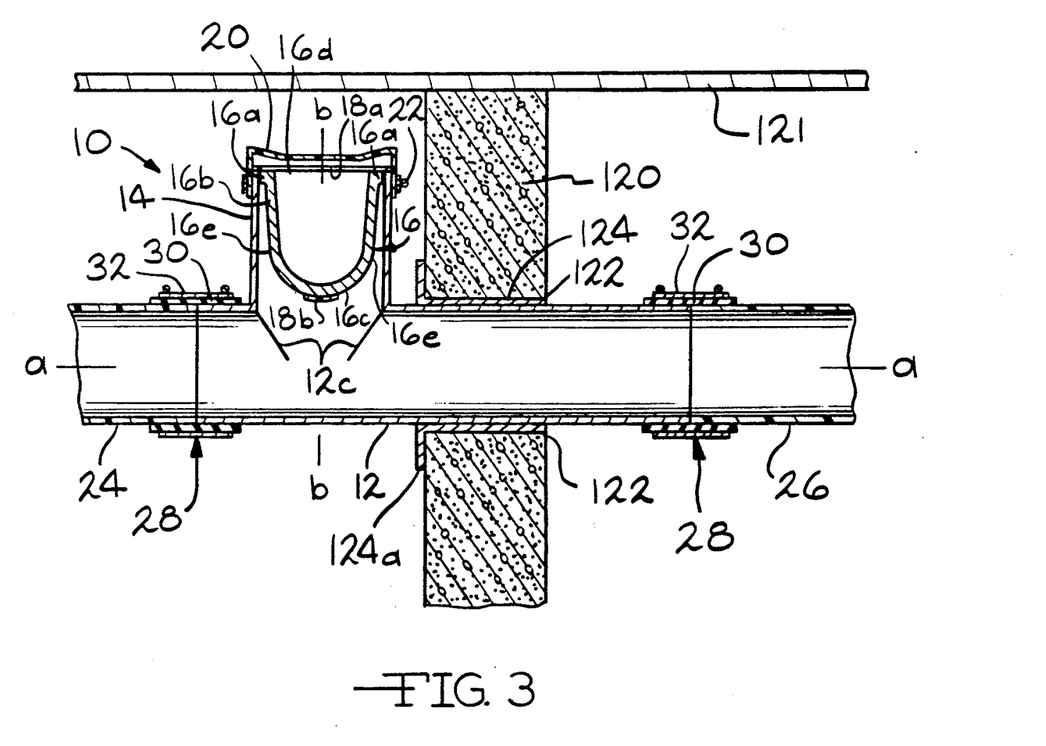
FIG. 3 is a front, cross-sectional view of the firestop fitting 10 horizontally mounted through a flanged coupling 124 horizontally mounted in a cored opening 122 in a concrete wall 120.
Figures 4, 5:
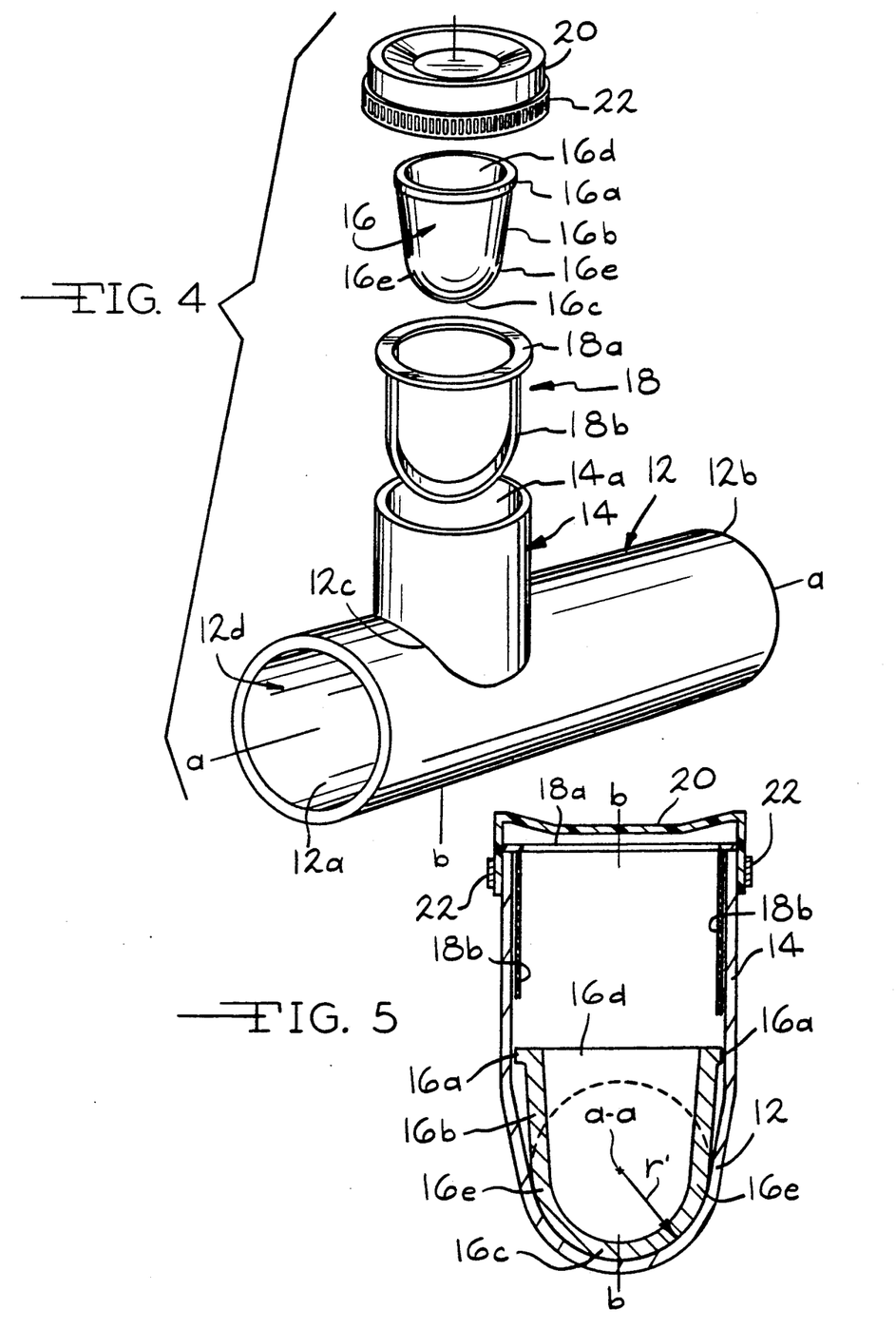
FIG. 4 is an isometric exploded view of the firestop fitting 10 particularly showing the mounting of a thermally releasable plug 16 in an extension conduit 14 from a main conduit 12.
FIG. 5 is a cross-sectional view showing the plug 16 released from the extension conduit 14 and moved into the main conduit 12 by gravity to block the horizontal flow through the main conduit 12.

FIGS. 1 to 4 show the firestop fitting 10 of the present invention for plastic horizontal drainage pipe. The fitting 10 includes a main conduit 12 along a horizontal axis a-a and an integral extension conduit 14 along a vertical axis b-b. The conduits 12 and 14 are made of a non-flammable material, particularly cast iron, and are generally in the form of an integral "T". As shown in FIG. 4, the main conduit 12 includes openings 12a and 12b for attaching pipe or other fittings for fluid passage in normal use. The extension conduit 14 has an opening 14a (FIG. 4) which serves to support a releasable plug 16. The plug 16 is in the shape of a hollow spheroconically shape member and includes an annular ring 16a, a body 16b, an apex end 16c and an opposite base end 16d. The plug 16 is mounted in opening 14a in the extension conduit 14 by means of a terminal release harness 18. The harness 18 includes collar 18a with integral strap 18b supported at opening 14a by the collar 18a. The harness 18 is held in place by means of a pressure test cap 20 mounted at the opening 14a. The cap 20 is composed of elastomeric PVC and is held in place by ring clamp 22 to close the open end 14a. Another embodiment (not shown) has two straps similar to strap 18b in an overlapping, X pattern. This embodiment does not release the plug 16 as quickly as the single strap 18b when the harness 18 is exposed to heat from a fire.

The extension conduit 14 is secured to the main conduit 12 by a welding process or it can be formed as an integral unit in a casting process. The main conduit 12 is cylindrical with a longitudinal axis a-a. The extension conduit 14 is cylindrical with a vertical axis b-b perpendicular to the axis a-a. As shown in cross-section in FIG. 1, starting on a vertical plane perpendicular with the axis a-a and along the axis b-b, from an upper extent of where the extension conduit 14 mounts the main conduit 12, the extension conduit 14 tapers downwardly and inwardly at about a 45° angle to a plane intersecting the axis a-a, perpendicular to the axis b-b. This forms a seam 12c between the conduits 12 and 14 around the circumference of the main conduit 12 in the shape of a saddle.

The annular ring 16a of the plug 16 has a clearance of about ⅝" (1.59 cm) with the extension conduit 14 so that when the plug 16 is released, it can fall freely into the main conduit 12. The body 16b of the plug 16 has a slight frusto-conical shape, tapering radially downwardly and inwardly to the axis b-b from the base end 16d to the upper edge 16e of the apex end 16c. The angle of taper of the body 16b is about 3° to insure that the plug 16 will not bind in the extension conduit 14 as it funnels into and blocks the main conduit 12. The apex end 16a of the plug has a radius of $r_1$ which is equal to the radius of an inside surface 12d of the main conduit 12 from the axis a-a to insure that the apex 16a of the plug will rest properly in the lower half of the main conduit as shown in FIG. 5.

As shown in FIG. 5, when the plug 16 is released, the spherical apex end 16c rests in and blocks the lower half of the main conduit 12 below a horizontal plane through the axis a-a while the body 16b of the plug 16 blocks the upper half of the main conduit 12 along a plane perpendicular to the axis a-a and through the axis b-b thereby plugging off the main conduit 12 along the axis a-a. At the same time, the ring 16a blocks the extension conduit 14 above the main conduit 12 along a plane perpendicular to the axis b-b.

Figure 1:
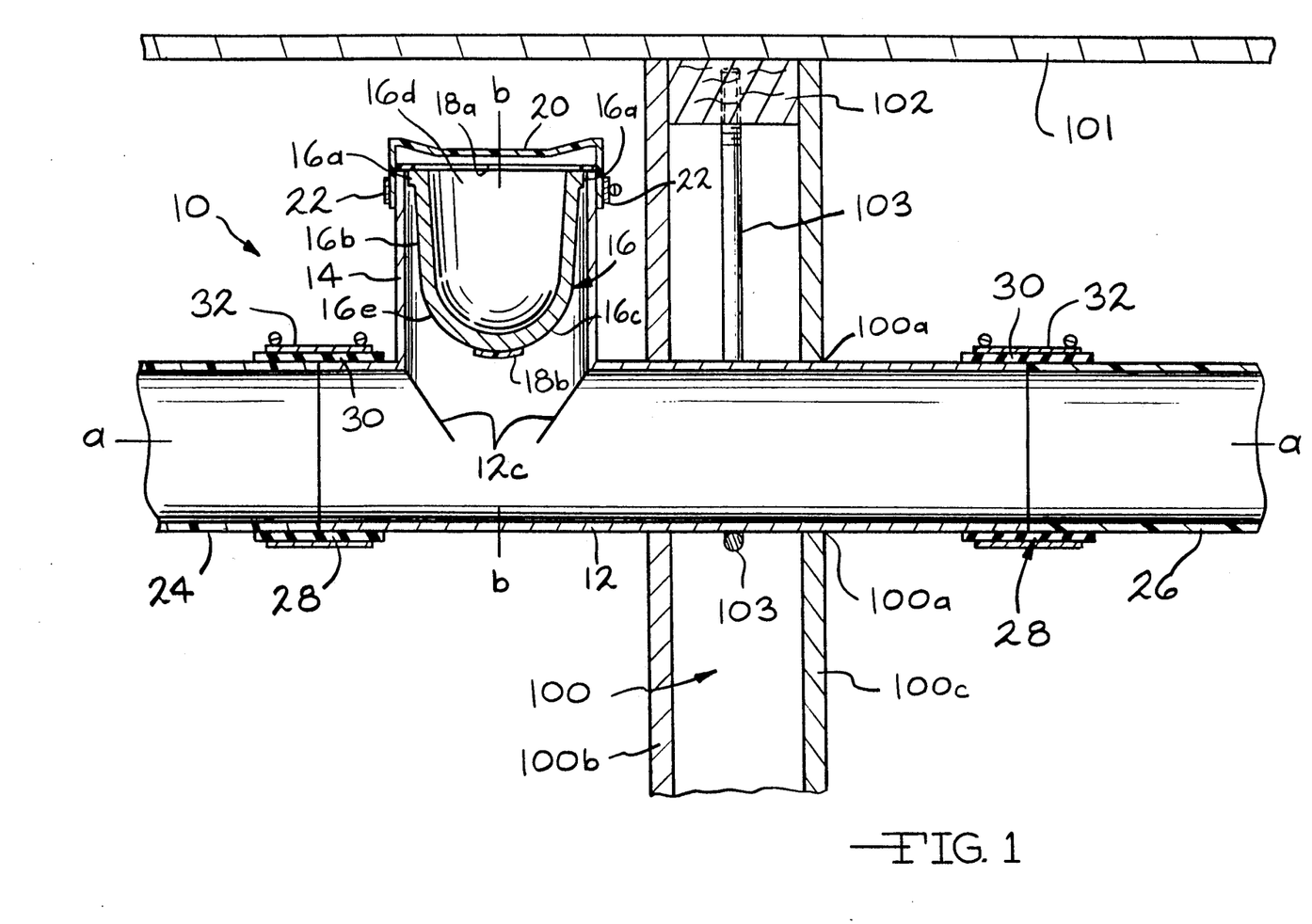
FIG. 1 is a front, cross-sectional view of the firestop fitting 10 particularly illustrating the mounting of a thermally releasable plug 16 in an extension conduit 14 from a main conduit 12 horizontally mounted through a wall 100.

FIG. 1 shows the main conduit 12 of the present invention horizontally mounted through a wall 100 with an opening 100a. The wall 100 is composed of spaced apart wall panels 100b and 100c extending to ceiling 101. The wall panels 100b and 100c are preferably constructed from gypsum, wood or the like and the opening 100a is drilled with a diameter slightly larger than the diameter of the main conduit 12. The panels 100b and 100c are spaced apart a minimum of 3.625 inches (9.2 cm) by a spacer 102 supporting an intermediate hanger member 103 which supports the main conduit 12 in the wall 100. This type of hanger 103 is well known to those skilled in the art.

The openings 12a and 12b of the conduit 12 are connected to plastic piping 24 and 26, respectively, preferably by means of standard steel reinforced band clamps 28. The band clamps 28 are comprised of a flexible rubber or plastic sleeve 30 reinforced with a steel band (not shown) with a ring clamp 32 mounted in the middle of the sleeve 30. To connect the pipe 24 to the main conduit 12, a band clamp 28 with the ring clamp 30 in a loose position, is first slid over openings 12a of the main conduit 12, or over the pipe 24. The ends of the pipe 24 and the main conduit 12 are then abutted against each other and the sleeve 30 of the band clamp 28 is centered at the abutment. The ring clamp 32 is then tightened onto the sleeve 30 of the band clamp 28, forming a water tight seal between the main conduit 12 and the pipe 24. This procedure is repeated to connect pipe 26 to opening 12b of the main conduit 12. This type of connection with the band clamp 28 is well known to those skilled in the art. Also, if the pipes 24 and 26 and the sleeve 30 of the band clamp 28 are plastic, they can be joined by solvent welding for added sealing.

FIG. 2 shows another embodiment of the mounting of the main conduit 12 of the firestop fitting 10 through a vertical poured concrete wall 110 extending to ceiling 101. A flammable coupling 112 with flange 112a, such as described in my U.S. Pat. No. 4,233,697, is first temporarily mounted onto a wooden form (not shown) for the wall 110 by nailing the flange 112a to the form. The concrete wall 110 is then poured and the form torn down, leaving the coupling 112 embedded in the wall 110. The coupling 112 can also be set into a masonary wall (not shown) by a mason. The coupling 112 is preferably provided in various diameters of type I PVC schedule 40 IPS DWX, conforming to U.S. Commercial Standard C.S. 272-65, ASTM 2665-74, FHA revision 31 to M.P.S., and supplied in various heights corresponding to the width of the concrete pour of the wall 110. A removable plastic cap (not shown) protects the coupling 112 during the concrete finishing process. Anchor rings 112b are molded in at one inch (2.54 cm) intervals on the exterior surface of the coupling 112. When the cast iron main conduit 12 of the firestop fitting 10 is inserted into the coupling 112, the plastic wall of the coupling 112 is sandwiched between the firestop fitting 10 and the concrete wall 110, allowing the coupling 112 to withstand extremely high temperatures without melting or burning due to the lack of oxygen.

FIG. 3 shows another embodiment of the mounting of the main conduit 12 of the firestop fitting 10 through a vertical, poured concrete wall 120 extending to ceiling 121. The concrete wall 120 is poured into a temporary form (not shown) similar to the concrete wall 110, and then the form is torn down. The wall 120 could also be a masonary wall. An opening 122 is then cored or bored through the wall 120 of a sufficient diameter to mount a flammable coupling 124 through the wall 120 with a flange 124a abutting against the wall 120. The coupling 124 is held in place by an adhesive caulk which is applied between the flange 124a and the wall 120. The flange 124a can have openings (not shown) for the adhesive to use as an anchor. The cast iron main conduit 12 of the firestop fitting 10 is then inserted into the coupling 124, sandwiching the plastic wall of the coupling 124 between the firestop fitting 10 and the concrete wall 120. This allows the coupling 124 to withstand extremely high temperatures without melting or burning due to the lack of oxygen. Coupling 124 is similar to coupling 112 except for the anchor rings 112b.

The overall length of the main conduit 12 is preferably about 16½ inches (41.9 cm). The fitting 10 is preferably made of gray cast iron in accordance with ASTM A-48 and design specification 474-75. The surface of the firestop fitting is preferably coated with SA 2702 Fire Protection Red heat resistant silicone coating.

Table 1 shows the preferred specifications for the iron portion of the stack fitting 10.

TABLE 1

ASTM A - 48
Gray Cast Iron With Controlling Sections .25–.50"

| Physical Properties | |
|---|---|
| Tensile Strength | 25.000 PSI Minimum |
| Brinnel Hardness | 160 to 212 |
| Chemical Composition | |
| Carbon | 3.30–3.60% |
| Silicon | 1.85–2.45% |
| Manganese | .40–.80% |
| Phosphorus | .15% Max. |
| Sulphur | .20% Max. |
| Microstructure | |
| Flake Graphite | Type A and B |
| Matrix | 60% to 100% Pearlite |
| | 10% Max. Fine Evenly Distributed Carbides |
| | 1" Max. D Graphite at Thin Edges with Less Than 40% Carbides |
| | 10% Max. Steadite Outlining Original Austenite Grain Boundaries |

The plug 16 is spheronconically shaped and made of the same cast iron material as the main conduit 12 and the extension conduit 14 of the firestop fitting 10 previously described in Table 1. The plug 16 is sized to drop through the extension conduit 14 and into the main conduit 12 of the firestop fitting 10, where the plug lodges to block flame and smoke penetration and prevent the fire stack effect. The ring 16a of plug 16 is preferably about ¼ inch (0.6 cm) smaller in diameter than the internal diameter of the extension conduit 14 and slightly larger by ¼ inch (0.6 cm) than the internal diameter of the main conduit 12. This allows the plug 16 a sufficient amount of room between itself and the extension conduit 14 so that the plug 16 will not bind or otherwise rest improperly in the main conduit 12.

The thermal release harness 18 is preferably composed of either polyethylene or polypropylene, preferably the latter, and designed to hold the flamestop plug 16 in place in the extension conduit 14 of the firestop fitting 10. Temperatures greater than 250° F. inside the firestop fitting 10 will cause the harness 18 to break away and collapse, triggering release of the flamestop plug 16.

The pressure test cap 20 composed of Type I PVC schedule 40 IPS DWV conforming to ASTM D-2466.

The cap 20 closes the opening 14a of the extension conduit 14.

A series 300 stainless steel ring clamp 22 secures the cap 20 to the opening 14a to provide a compression joint with the cast iron extension conduit 14. The cap 20 allows pressure testing of the system of pipes 24 and 26 and couplings 28. The ring clamp 22 allows removal of the cap 20 for periodic inspection of the plug 16 and harness 18.

The angle between the extension conduit 14 and the main conduit 12 is preferably 90° to insure gravity feed of the plug 16 upon rupture of the harness 18. It will be appreciated that various spring means (not shown) between the cap 20 and the plug 16 can be used to urge the plug 16 into the main conduit 12; however, these are expensive and unnecessary.

In normal operation, the firestop fitting 10 functions as a leak proof horizontal drainage passage through the walls 100, 110 and 120. When fire breaks out in the building, the pipes 24 and 26 melt if they are composed of PVC. This allows heating the iron main conduit 12 and extension conduit 14. When the temperature reaches 225° F. (106° C.) (which is well below normal flammability levels of PVC and most other plastic pipe materials) the harness 18 ruptures and the plug 16 is released into the main conduit 12. The result is that the fire cannot penetrate to the other side of the walls 110 and 120 and must actually burn through the wood or gypsum wall 100 to reach the other side of the wall 100. Also the cap 20 can melt causing release of the plug 16 by melting the harness 18. Based upon Underwriters Laboratories (UL) Tests, the firestop fitting 10 installed in the wall 100 has been given a 2 hour fire rating which is believed to be unprecedented in the building construction field. The firestop fitting 10 installed in walls 110 and 120 give even longer fire ratings.

As can be seen from the foregoing description, the present invention provides a unique device for the prevention of the spread of fire between adjoining rooms through a wall in a building.

Numerous variations will occur to those skilled in the art. It is intended that the foregoing descriptions be only illustrative of the present invention and that the present invention be limited only by the hereinafter appended claims.

I claim:

1. A firestop fitting which prevents the spread of smoke and fire through a wall between rooms in a building which comprises:
   (a) a non-flammable, fluid carrying main conduit having opposed ends which provide an opening along a longitudinal axis through the wall of the building and adapted to be connected to horizontally oriented fluid carrying plastic pipe in rooms including the wall in the building;
   (b) a non-flammable extension conduit from the main conduit having a second axis perpendicular to the axis of the main conduit with an inside wall extending to an opening;
   (c) a non-flammable plug mounted in the extension conduit on a plastic support provided in the extension conduit which is releasable by melting upon exposure of the support to heat less than necessary for heat destruction of the plastic pipe to which the main conduit is adapted to be connected from a fire in the building to thereby move the plug into and block the main conduit; and
   (d) closure means for the extension conduit opening.

2. A firestop fitting which prevents the spread of smoke and fire through a wall between rooms in a building which comprises:
   (a) a non-flammable, fluid carrying main conduit having opposed ends which provide an opening along a longitudinal axis through the wall of the building and adapted to be connected to horizontally oriented fluid carrying plastic pipe in rooms including the wall in the building;
   (b) a non-flammable extension conduit from the main conduit having a second axis perpendicular to the axis of the main conduit with an inside wall extending to an opening;
   (c) a non-flammable plug mounted in the extension conduit on a plastic support provided in the extension conduit which is releasable by melting upon exposure of the support to heat less than necessary for heat destruction of the plastic pipe to which the main conduit is adapted to be connected from a fire in the building to thereby move the plug into and block the main conduit, wherein the plastic support is provided by a harness with a strap upon which the plug rests, with the harness joined to a holding ring which is mounted in the extension conduit and wherein the strap is broken by heat from a fire to release the plug which moves by gravity into the main conduit; and
   (d) closure means for the extension conduit opening.

3. The fitting of claim 2 wherein the main conduit and the extension conduit are integral, each having a circular internal cross-section and wherein the plug has a spaced apart base end and a hemispherical apex end positioned towards the main conduit and an intermediate frusto-conical body between the ends.

4. The fitting of claim 3 wherein the plug has an annular ring adjacent the base end having a diameter slightly smaller than an internal diameter of the extension conduit opening so that when the plug moves into the main conduit, the plug blocks the main conduit along a plane perpendicular to the longitudinal axis of the main conduit with the apex end blocking the main conduit below a plane that passes through the longitudinal axis of the main conduit and perpendicular to the second axis of the extension conduit, and with the frusto-conical body of the plug blocking the main conduit along a plane through the second axis of the extension conduit and perpendicular to the longitudinal axis and with the annular ring at the base end blocking the extension conduit adjacent to the main conduit along a plane perpendicular to the second axis of the extension conduit.

5. The fitting of claim 2 wherein the strap and holding ring of the harness are integral.

6. The fitting of claim 2 wherein the holding ring of the harness is attached adjacent to the opening in the extension conduit.

7. The fitting of claim 6 wherein the strap and holding ring of the harness are attached to the extension conduit by the closure means for the extension conduit opening.

8. The fitting of claim 7 wherein the closure means includes a cap secured adjacent to the extension conduit opening by a ring clamp.

9. The fitting of claim 2 with a sleeve mounted around the main conduit, wherein the wall of the building is to be made of concrete with the sleeve embedded in the wall which mounts the main conduit to provide an opening in the wall and wherein an inside diameter of the sleeve is only slightly larger than a diameter of an outside wall of the main conduit so that the main conduit can be mounted in the opening in the wall.

10. The fitting of claim 2 with a sleeve mounted around the main conduit, wherein the wall of the building is to be made of concrete and an opening cored or bored through the wall and wherein the sleeve is adapted to be mounted in the opening with a flange of the sleeve adjacent to one side of the wall and wherein an inside diameter of the sleeve is only slightly larger than a diameter of an outside wall of the main conduit so that the main conduit can be mounted on the sleeve in the opening in the wall.

11. The fitting of claim 10 wherein the flange is adapted to be coated with an adhesive which bonds the flange of the sleeve to the wall for securing the sleeve in the opening through the wall.

12. The fitting of claim 2 with a hanger means mounted around the main conduit wherein the wall between rooms in the building comprises two spaced apart parallel wall members with openings through the wall members along the longitudinal axis for mounting the main conduit and wherein the hanger means can be mounted between the wall members to support the main conduit in the openings in the wall members.

13. The fitting of claim 12 wherein the wall members are made of wood.

14. The fitting of claim 12 wherein the wall members are made of gypsum.

15. The fitting of claim 2 wherein two horizontally oriented fluid carrying plastic pipes are secured to the opposed ends of the main conduit by coupling means at each of the opposed ends of the main conduit.

16. The fitting of claim 15 wherein the coupling means comprises two annular band means secured to an end of each of the horizontally oriented fluid carrying pipes and to each of the ends of the main conduit by adjustable clamp means.

17. A building construction which prevents the spread of smoke and fire through a wall between rooms in a building which comprises:
(a) a firestop fitting which prevents the spread of fire and smoke through the wall between rooms in the building which comprises: a non-flammable, fluid carrying main conduit having opposed ends which provide an opening along a longitudinal axis through the wall of the building and adapted to be connected to horizontally oriented fluid carrying plastic pipe in rooms including the wall in the building; a non-flammable extension conduit from the main conduit having a second axis perpendicular to the axis of the main conduit with an inside wall extending to an opening; a non-flammable plug mounted in the extension conduit on a plastic support provided in the extension conduit which is releasable by melting upon exposure of the support to heat less than necessary for heat destruction of the plastic pipe to which the main conduit is adapted to be connected from a fire in the building to thereby move the plug into and block the main conduit; and
(b) fluid carrying plastic pipe connected to both ends of the main conduit.

18. A building construction which prevents the spread of smoke and fire through a wall between rooms in a building which comprises:
(a) a firestop fitting which prevents the spread of fire and smoke through the wall between rooms in the building which comprises: a non-flammable, fluid carrying main conduit having opposed ends which provide an opening along a longitudinal axis mounted through the wall of the building and adapted to be connected to horizontally oriented fluid carrying plastic pipe in rooms including the wall in the building; a non-flammable extension conduit from the main conduit having a second axis perpendicular to the axis of the main conduit with an inside wall extending to an opening; a non-flammable plug mounted in the extension conduit on a plastic support provided in the extension conduit which is releasable by melting upon exposure of the support to heat less than necessary for heat destruction of the plastic pipe to which the main conduit is adapted to be connected from a fire in the building to thereby move the plug into and block the main conduit wherein the plastic support is provided by a harness with a strap upon which the plug rests, with the harness joined to a holding ring which is mounted in the extension conduit and wherein the strap is broken by heat from a fire to release the plug which moves by gravity into the main conduit; and closure means for the extension conduit opening; and
(b) fluid carrying plastic pipe connected to both ends of the main conduit.

19. The building construction of claim 18 wherein the fitting includes the main conduit and the extension conduit which are integral, each having a circular internal cross-section and wherein the plug has a spaced apart base end and a hemispherical apex end positioned towards the main conduit and an intermediate frusto-conical body between the ends.

20. The building construction of claim 19 wherein the plug in the fitting has an annular ring adjacent to the base end having a diameter slightly smaller than an internal diameter of the extension conduit opening so that when the plug moves into the main conduit, the plug blocks the main conduit along a plane perpendicular to the longitudinal axis of the main conduit with the apex end blocking the main conduit below a plane that passes through the longitudinal axis of the main conduit and perpendicular to the second axis of the extension conduit and with the frusto-conical body of the plug blocking the main conduit along a plane through the second axis of the extension conduit and perpendicular to the longitudinal axis and with the annular ring at the base end blocking the extension conduit adjacent to the main conduit along a plane perpendicular to the second axis of the extension conduit.

21. The building construction of claim 18 wherein the strap and holding ring of the harness are integral.

22. The building construction of claim 18 wherein the holding ring of the harness is attached adjacent to the opening in the extension conduit.

23. The building construction of claim 22 wherein the strap and holding ring of the harness are attached to the extension conduit by the closure means for the extension conduit opening.

24. The building construction of claim 23 wherein the closure means includes a cap secured adjacent to the extension conduit opening by a ring clamp.

25. The building construction of claim 18 wherein the wall of the building is made of poured concrete and a sleeve is embedded in the poured concrete along the longitudinal axis to provide an opening in the wall for the main conduit and wherein an inside diameter of the sleeve is only slightly larger than an outside wall of the main conduit so as to mount the main conduit.

26. The building construction of claim 18 wherein the wall of the building is made of concrete and an opening has been cored or bored through the wall around the longitudinal axis of the main conduit and wherein a sleeve is mounted through the opening in the wall with a flange on the sleeve adjacent to one side of the wall and wherein an inside diameter of the sleeve is only slightly larger than an outside wall diameter of the main conduit so as to mount the main conduit in the opening in the wall.

27. The building construction of claim 26 wherein the sleeve is mounted in the opening in the wall by an adhesive which bond the flange of the sleeve to the one side of the wall for securing the sleeve in the opening through the wall.

28. The building construction of claim 18 with a hanger means mounted around the main conduit and on the wall, wherein the wall of the building comprises two spaced apart parallel wall members with an opening through the wall members around the longitudinal axis of the main conduit for mounting the main conduit and wherein the hanger means is mounted between the wall members and supports the main conduit in the opening.

29. The building construction of claim 28 wherein the wall members are made of wood.

30. The building construction of claim 28 wherein the wall members are made of gypsum.

31. The building construction of claim 18 wherein the connection between the fluid carrying pipe and the main conduit comprises annular band means secured to an end of each of the horizontally oriented fluid carrying pipes and to each of the ends of the main conduit by clamp means.

32. A method for constructing a building which prevents the spread of smoke and fire through a wall between rooms in the building which comprises:
  (a) providing a firestop fitting which prevents the spread of fire and smoke through the wall between rooms in the building which comprises: a non-flammable, fluid carrying main conduit having opposed ends which provide an opening along a longitudinal axis through the wall of the building and adapted to be connected to horizontally oriented fluid carrying plastic pipe in rooms including the wall in the building; a non-flammable extension conduit from the main conduit having a second axis perpendicular to the axis of the main conduit with an inside wall extending to an opening; a non-flammable plug mounted in the extension conduit on a plastic support provided in the extension conduit which is releasable by melting upon exposure of the support to heat less than necessary for heat destruction of the plastic pipe to which the main conduit is adapted to be connected from a fire in the building to thereby move the plug into and block the main conduit;
  (b) mounting the main conduit of the firestop fitting through the opening in the wall of the building so as to convey fluid between rooms in the building; and
  (c) attaching fluid carrying plastic pipe to both ends of the main conduit.

33. The method of constructing a building according to claim 32 wherein the fitting includes the main conduit and the extension conduit which are integral, each having a circular internal cross-section and wherein the plug has a spaced apart base end and a hemispherical apex end positioned towards the main conduit and an intermediate frusto-conical body between the ends.

34. The method of constructing a building according to claim 33 wherein the plug in the fitting has an annular ring adjacent to the base end having a diameter slightly smaller than an internal diameter of the extension conduit opening so that when the plug moves into the main conduit, the plug blocks the main conduit along a plane perpendicular to the longitudinal axis of the main conduit with the apex end blocking the main conduit below a plane that passes through the longitudinal axis of the main conduit and perpendicular to the second axis of the extension conduit and with the frusto-conical body of the plug blocking the main conduit along a plane through the second axis of the extension conduit and perpendicular to the longitudinal axis and with the annular ring at the base end blocking the extension conduit adjacent to the main conduit along a plane perpendicular to the second axis of the extension conduit.

35. The method of constructing a building according to claim 32 wherein the strap and holding ring of the harness are integral.

36. The method of constructing a building according to claim 32 wherein the holding ring of the harness is attached adjacent to the opening in the extension conduit.

37. The method of constructing a building according to claim 36 wherein the strap and holding ring of the harness are attached to the extension conduit by the closure means for the extension conduit opening.

38. The method of constructing a building according to claim 37 wherein the closure means includes a cap secured adjacent to the extension conduit opening by a ring clamp.

39. The method of constructing a building according to claim 32 wherein the wall of the building is made of poured concrete and a sleeve is embedded in the poured concrete along the longitudinal axis to provide an opening in the wall for the main conduit and wherein an inside diameter of the sleeve is only slightly larger than an outside wall of the main conduit so as to mount the main conduit.

40. The method of constructing a building according to claim 32 wherein the wall of the building is made of concrete and an opening has been cored or bored through the wall around the longitudinal axis of the main conduit and wherein a sleeve is mounted through the opening in the wall with a flange on the sleeve adjacent to one side of the wall and wherein an inside diameter of the sleeve is only slightly larger than an outside wall diameter of the main conduit so as to mount the main conduit in the opening in the wall.

41. The method of constructing a building according to claim 40 wherein the sleeve is mounted in the opening in the wall by an adhesive which bonds the flange of the sleeve to the one side of the wall for securing the sleeve in the opening through the wall.

42. The method of constructing a building according to claim 32 with a hanger means mounted around the main conduit and on the wall, wherein the wall of the building comprises two spaced apart parallel wall members with an opening through the wall members around the longitudinal axis of the main conduit for mounting the main conduit and wherein the hanger means is mounted between the wall members and supports the main conduit in the opening.

43. The method of constructing a building according to claim 42 wherein the wall members are made of wood.

44. The method of constructing a building according to claim 42 wherein the wall members are made of gypsum.

45. The method of constructing a building according to claim 32 wherein the connection between the fluid carrying pipe and the main conduit comprises annular band means secured to an end of each of the horizontally oriented fluid carrying pipes and to each of the ends of the main conduit by clamp means.

* * * * *